March 20, 1956 F. M. KELLER 2,738,573
METHOD FOR MAKING AN INTERNALLY THREADED
POLYGONAL ARTICLE
Filed Sept. 21, 1951

INVENTOR.
FRED M. KELLER
BY
ATTORNEY

United States Patent Office 2,738,573
Patented Mar. 20, 1956

2,738,573

METHOD FOR MAKING AN INTERNALLY THREADED POLYGONAL ARTICLE

Fred M. Keller, Grand Rapids, Mich., assignor to The Jervis-Middleville Corporation, Grandville, Mich., a corporation of Michigan Application September 21, 1951, Serial No. 247,617

1 Claim. (Cl. 29—529)

This invention relates to a method for making an internally threaded polygonal article and particularly to the making of a nut which is largely used in the plumbing trade.

In the plumbing trade there is used a type of large diameter, internally threaded, nut for screwing a flange or washer against a backing plate. The manufacture of this not is highly competitive and persistent efforts are being made, and have for a long time been made, to reduce its cost of manufacture. Some competitive manufacturing methods involve die casting of the rough, unthreaded, nut and later finishing by machine methods. These methods offer the best possibilities of low cost manufacture and, in fact, are the methods most commonly employed commercially. However, even these methods, as practiced at present, are highly competitive between themselves and the manufacturers utilizing them are subject to heavy pressures for still further reductions in cost. Some of said methods contemplate placing the parting line of the die substantially intermediate the body of the nut which method results in flashing from the die running across the flat faces of the nut and requiring an expensive grinding operation to remove. This method does, however, have an advantage in utilizing a relatively inexpensive die. Another method is designed to eliminate, or at least minimize, the necessity for the grinding operation mentioned with respect to the preceding described method but it has the disadvantage of requiring a die which is much more expensive to prepare. In this approach the parting line follows the curve of one side or the other of the flat faces and thereby the slight amount of flashing that usually appears is located at a point where it will be of no consequence.

The present invention contemplates a series of steps by which both of the disadvantages above named are eliminated, no other disadvantages of comparable extent are introduced and the final product suffers no reduction in quality. It requires no special tooling excepting a die which is as easily made as the die of any of the present conventional methods and it is adapted to utilizing a conventional automatic tool of common type in the finishing operations.

This invention proceeds upon the observation that in each of the conventional methods it is deemed impractical to cast the threads into the nut and hence a tapping operation is required to provide the threads. Thus, inasmuch as the part requires the tapping operation anyway, it is a simple matter to utilize any of several types of turret machines to perform a simple machining operation immediately ahead, or immediately subsequent to, the tapping operation.

Accordingly, the principal problem in following this approach has been to discover a method of manufacture in which the nut could be finished by a machining or skiving operation which could be performed on the same machine as that which performs the tapping operation.

Therefore, a major object of the invention has been to provide a method consisting of a series of steps by which an internally threaded polygonal article could be fabricated at less expense than by previous methods.

A further object of the invention has been to provide a method consisting of a series of steps capable of utilizing for the purpose aforesaid substantially conventional apparatus.

A further object of the invention has been to provide a method, as aforesaid, wherein the modifications required to conventional apparatus are simple and inexpensive.

A further object of the invention has been to provide a method, as aforesaid, wherein the final product suffers no deterioration in quality over products made by previous methods.

A further object of the invention has been to provide a method utilizing die casting procedure for making an internally threaded, polygonal, article which requires the use of a die of maximum simplicity.

A further object of the invention has been to provide a method of making a polygonal, internally threaded, article wherein the removal of flashing is reduced to a type of operation capable of being performed substantially automatically by conventional machinery.

Other objects and purposes of the invention will be apparent to persons acquainted with operations of this general type upon reading of the following disclosure and an inspection of the accompanying drawings.

General description

In general, my process contemplates casting by conventional die casting procedures the article in an intermediate stage, which for reference purposes will hereinafter be termed the "skiving blank," wherein the parting line is placed at the end thereof at which the tapping tool enters in tapping the threads. The next operation is to skive the blank by relative rotary motion between the skiving tool and the skiving blank, which motion will be of the same nature as that actuating the tapping operation, whereby the flashing is cut off and the desired taper at that end of the nut is simultaneously provided. The advantage of this method lies in the avoidance of an expensive die for carrying it out, such as the die wherein the parting line follows the edges of the flat sides of the nut, and yet it requires only a skiving operation which can be performed rapidly and on a machine substantially similar to the tapping machine, as a turret machine having a skiving tool and a tap at two stations thereof, whereby the skiving operation can be performed quickly and inexpensively.

Detailed description

Figure 1:
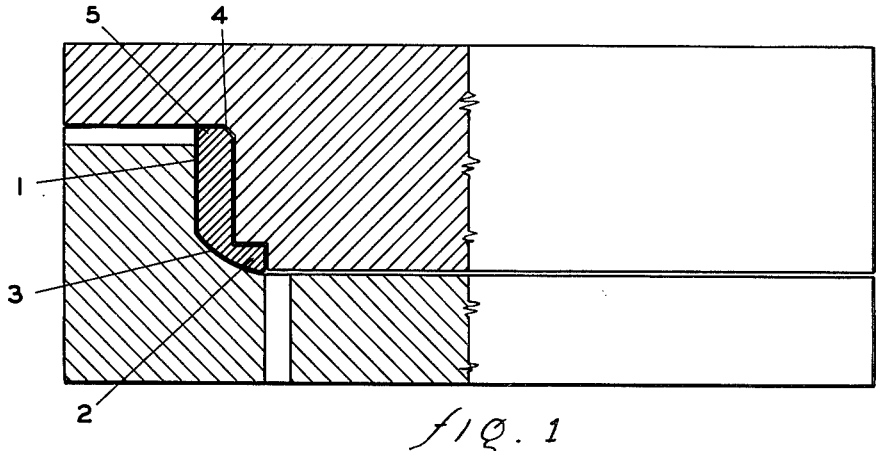
Figure 1 illustrates a side elevation, with one half thereof in diametric cross section, of the partially made article as it appears when ready for removal from the die casting machine and showing also in cross section a portion of a satisfactory die.

For purpose of further convenient reference, but with no thought of limitation, the terms "upper end" and "lower end" of the nut will refer to the portions of the nut or of the skiving blank, as appearing above in Figure 1.

The terms "upwardly" and "downwardly" will have similar, corresponding, meanings.

Referring first to Figure 1, the die is so shaped that it will form a skiving blank having the usual polygonal, as hexagonal or octagonal, sides 1 and the usual internal flange 2. The lower end is tapered at 3, also in a conventional manner. The upper inner edge of the skiving blank has a small bevel at 4 but the upper outer edge is formed with the rectangular corner indicated at 5. This will be well understood by those familiar with methods and products of this general type and those skilled in the art will have no trouble in making a die to provide a skiving blank of the shape and characteristics above described and hence no further description of said skiving blank or the die appears either necessary or desirable.

Upon completion of the casting, the skiving blank is then transferred to any conventional type of tapping machine which is preferably of the turret type and wherein the tapping tool and the hereinafter mentioned skiving tool appear at two stations of the turret. However, it will be understood that the use of the turret machine is not essential to the practice of my process and, in fact, the method of this invention will be found of material advantage and economy over previous methods even without the use of a turret machine.

Likewise, it is immaterial whether the skiving step or the tapping step be effected first although for illustrative purposes it will hereinafter be assumed that the skiving step is carried out first and is then followed by the tapping step. Likewise, it will be apparent to those skilled in the art that it is immaterial whether the skiving blank rotates against the tool or whether the tool rotated against a relatively stationary skiving blank, but for illustrative purposes it will hereinafter be assumed that the work is held stationary and the skiving tool rotates.

Figure 2:
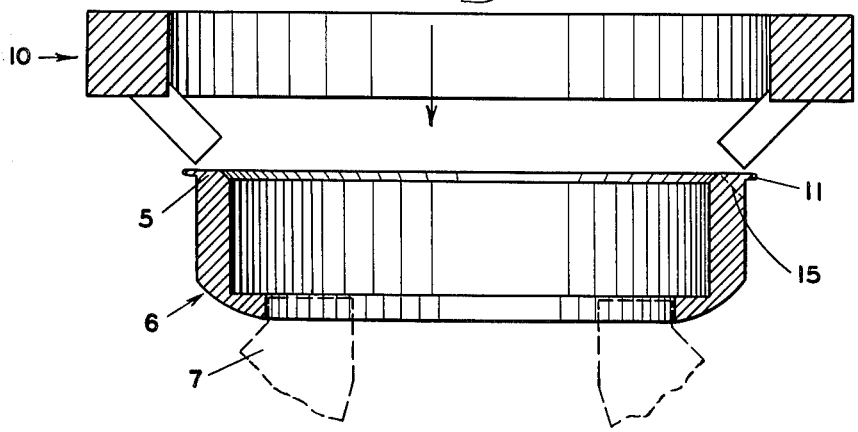
Figure 2 shows the article taken from the die casting machine and place in relation with a skiving tool ready for the skiving step.
Figure 4:
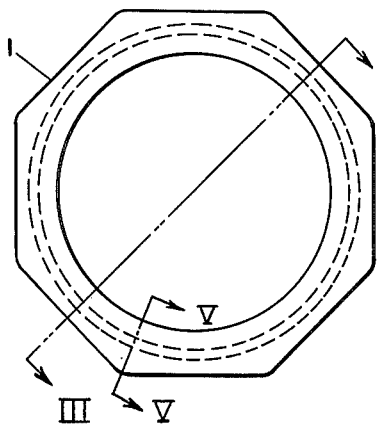
Figure 4 shows a plan view of a nut made by the present process.

Referring now to Figure 2 it will be observed that the skiving blank 6 is held against rotation by a chuck 7 of conventional form and the skiving tool 10 is approaching same for working thereon. The flashing on the work is shown in somewhat exaggerated form for clarity of illustration.

The skiving tool is of internally tapered shape wherein the angle of taper is the same as the angle of taper on the upper, outer, end of the finished article. The skiving tool and the work are then brought together and the skiving blank is cut down to the point indicated by the broken line 15 in Figure 2.

It will be apparent that by this operation the flashing is removed and, simultaneously, the part is finished to its finally desired form excepting only the tapping. It will be understood by those skilled in the art that the time required to accomplish this step will be materially less than that required to accomplish conventional grinding wherein the flat surface of each flat face must be separately ground by separate relative positioning of the work and the grinding tool.

Figure 3:
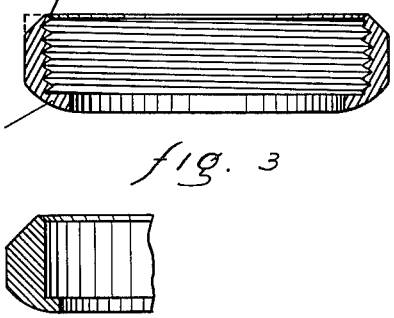
Figure 3 shows the article with the skiving step completed and showing in broken lines the material removed by the skiving tool and taken on line III—III of Figure 4.
Figure 5:
Figure 5 shows a section taken on line V—V of Figure 4, but showing the nut before the threading operation has been performed thereon.

When the skiving is thus completed, the work is moved to the tapping tool and the tap is made in a conventional manner to complete the article to the form as shown in Figure 3.

Accordingly, I have described a method for making internally threaded, polygonal, articles effecting the purposes and advantages above set forth.

I claim:

In a method for making an externally polygonal article having an internally threaded opening therethrough whose axis is parallel with and equidistant from the external polygonal faces, the steps comprising: die casting a blank of said article with a cylindrical opening therethrough and the die flashing extending radially therefrom adjacent one axial end thereof; rigidly holding said blank in a work receiving position; machining off said flashing and continuing the same machining operation to provide an external, conical bevel intersecting said faces at said end of said article; internally tapping said opening from said end of said article; and releasing said article.

References Cited in the file of this patent

UNITED STATES PATENTS

| | | |
|---|---|---|
| 1,416,412 | Pack | May 16, 1922 |
| 1,736,495 | Graf | Nov. 19, 1929 |
| 1,860,605 | Baldwin, Jr. | May 31, 1932 |
| 2,009,644 | Zimmerman | July 30, 1935 |
| 2,176,993 | Gazey | Oct. 24, 1939 |
| 2,540,457 | Rice | Feb. 6, 1951 |

OTHER REFERENCES

Die Casting (Stern), published by McGraw-Hill Co., 370 7th Ave., New York, N. Y., 1930 (p. 31 relied on).